(12) United States Patent
Xia et al.

(10) Patent No.: US 10,771,458 B1
(45) Date of Patent: Sep. 8, 2020

(54) PROXIMITY-BASED USER AUTHENTICATION

(71) Applicant: MicroStrategy Incorporated, Vienna, VA (US)

(72) Inventors: Feng Xia, Sterling, VA (US); Siamak Ziraknejad, Reston, VA (US); Liang Chen, Fairfax, VA (US); Quan Jia, Oakton, VA (US)

(73) Assignee: MicoStrategy Incorporated, Vienna, VA (US)

( * ) Notice: Subject to any disclaimer, the term of this patent is extended or adjusted under 35 U.S.C. 154(b) by 221 days.

(21) Appl. No.: 15/955,277

(22) Filed: Apr. 17, 2018

Related U.S. Application Data

(60) Provisional application No. 62/486,321, filed on Apr. 17, 2017.

(51) Int. Cl.

| | | |
|---|---|---|
| *H04L 29/06* | (2006.01) | |
| *G06F 21/45* | (2013.01) | |
| *H04W 4/02* | (2018.01) | |
| *H04W 12/06* | (2009.01) | |
| *H04L 29/08* | (2006.01) | |

(52) U.S. Cl.
CPC ........ *H04L 63/0853* (2013.01); *H04L 63/107* (2013.01); *H04L 67/18* (2013.01); *H04W 4/02* (2013.01); *H04W 12/06* (2013.01)

(58) Field of Classification Search
CPC ....... H04W 12/08; H04W 4/023; H04W 4/80; H04W 12/06; H04W 76/14; H04L 9/30; H04L 63/083; H04L 2209/80
USPC .......................................................... 726/6
See application file for complete search history.

(56) References Cited

U.S. PATENT DOCUMENTS

| | | |
|---|---|---|
| 5,812,764 A | 9/1998 | Heinz, Sr. |
| 6,061,790 A | 5/2000 | Bodnar |
| 6,317,829 B1 | 11/2001 | Van Oorschot |
| (Continued) | | |

FOREIGN PATENT DOCUMENTS

WO     WO2010052669     5/2010

OTHER PUBLICATIONS

"MacID: Unlock your Mac with just your fingerprint," Kane Cheshire, Mar. 2015, [retrieved on Dec. 30, 2015]. Retrieved from the Internet: URL<http://macid.co/>. 4 pages.

(Continued)

*Primary Examiner* — Haresh N Patel
(74) *Attorney, Agent, or Firm* — Fish & Richardson P.C.

(57) ABSTRACT

Methods, systems, and apparatus, including computer programs encoded on a computer-readable storage medium, for automatically providing a user with access to a secured resource. In some implementations, a client device detects that a second device that has been designated as an authentication for a user is within a predetermined level of proximity to the client device. The client device sends data indicating that the second device is within the predetermined level of proximity of the client device to a server system. The client device receives data indicating an attempt to access a resource using the client device while the second device is within the predetermined level of proximity to the client device. The client device sends an authentication request to the server system. The client device receives data indicating approval of the authentication request and provides access to the resource.

20 Claims, 7 Drawing Sheets

(56) References Cited

U.S. PATENT DOCUMENTS

| | | |
|---|---|---|
| 6,694,431 B1 | 2/2004 | Binding |
| 6,720,860 B1 | 4/2004 | Narayanaswami |
| 7,284,127 B2 | 10/2007 | Gehrmann |
| 7,378,939 B2 | 5/2008 | Sengupta et al. |
| 7,395,549 B1 | 7/2008 | Perlman |
| 7,400,878 B2 | 7/2008 | Hassan et al. |
| 7,418,596 B1 | 8/2008 | Carroll |
| 7,424,615 B1 | 9/2008 | Jalbert |
| 7,599,493 B2 | 10/2009 | Sandhu |
| 7,600,676 B1 | 10/2009 | Rados et al. |
| 7,734,045 B2 | 6/2010 | Sandhu |
| 7,881,288 B2 | 2/2011 | Noldus et al. |
| 7,979,899 B2 | 7/2011 | Guo et al. |
| 8,286,227 B1 | 10/2012 | Zheng |
| 8,307,406 B1 | 11/2012 | Aboujaoude |
| 8,327,422 B1 | 12/2012 | Friedman |
| 8,371,501 B1 | 2/2013 | Hopkins |
| 8,423,768 B2 | 4/2013 | Huang |
| 8,467,770 B1 | 6/2013 | Ben Ayed |
| 8,498,618 B2 | 7/2013 | Ben Ayed |
| 8,539,559 B2 | 9/2013 | Nakhjiri |
| 8,601,602 B1 | 12/2013 | Zheng |
| 8,621,005 B2 | 12/2013 | Boyd et al. |
| 8,625,796 B1 | 1/2014 | Ben Ayed |
| 8,711,656 B1 | 4/2014 | Paulson |
| 8,923,191 B2 | 12/2014 | Hanson |
| 8,955,081 B2 | 2/2015 | Metke |
| 9,075,979 B1 | 7/2015 | Queru |
| 9,301,139 B2 | 3/2016 | Korgaonkar |
| 9,401,915 B2 | 7/2016 | DeWeese et al. |
| 9,438,332 B2 * | 9/2016 | Tian .......... H04B 7/24 |
| 9,520,918 B2 | 12/2016 | Adrangi |
| 9,741,033 B2 | 8/2017 | Bhatnagar |
| 9,846,977 B1 * | 12/2017 | Cox .......... G07C 5/02 |
| 9,906,561 B2 | 2/2018 | Jain et al. |
| 10,064,052 B2 * | 8/2018 | Peluso .......... H04W 12/003 |
| 10,206,099 B1 | 2/2019 | Trinh et al. |
| 10,212,136 B1 | 2/2019 | Gehret et al. |
| 10,231,128 B1 * | 3/2019 | Ziraknejad .......... H04L 9/0825 |
| 2002/0180586 A1 | 12/2002 | Kitson et al. |
| 2002/0194500 A1 | 12/2002 | Bajikar |
| 2003/0046589 A1 | 3/2003 | Gregg |
| 2003/0063003 A1 | 4/2003 | Bero et al. |
| 2003/0065919 A1 | 4/2003 | Albert |
| 2004/0203595 A1 | 10/2004 | Singhal |
| 2004/0243856 A1 | 12/2004 | Shatford |
| 2005/0044393 A1 | 2/2005 | Holdsworth |
| 2005/0221798 A1 | 10/2005 | Sengupta et al. |
| 2005/0268107 A1 | 12/2005 | Harris et al. |
| 2005/0269401 A1 | 12/2005 | Spitzer et al. |
| 2006/0083208 A1 | 4/2006 | Lin |
| 2006/0242423 A1 | 10/2006 | Kussmaul |
| 2007/0061590 A1 | 3/2007 | Boye et al. |
| 2007/0130472 A1 | 6/2007 | Buer |
| 2008/0016537 A1 | 1/2008 | Little |
| 2008/0052775 A1 | 2/2008 | Sandhu |
| 2008/0250147 A1 | 10/2008 | Knibbeler et al. |
| 2008/0289030 A1 | 11/2008 | Poplett |
| 2009/0093215 A1 | 4/2009 | Eisenbach |
| 2009/0121890 A1 | 5/2009 | Brown et al. |
| 2009/0313687 A1 | 12/2009 | Popp |
| 2010/0031345 A1 | 2/2010 | Sinclair |
| 2010/0063895 A1 | 3/2010 | Dominguez et al. |
| 2010/0120406 A1 | 5/2010 | Banga |
| 2010/0275010 A1 | 10/2010 | Ghirardi |
| 2011/0081860 A1 | 4/2011 | Brown |
| 2011/0169654 A1 | 7/2011 | Ketari |
| 2011/0221590 A1 | 9/2011 | Baker |
| 2011/0314539 A1 | 12/2011 | Horton |
| 2012/0066749 A1 | 3/2012 | Taugbol et al. |
| 2012/0272279 A1 | 10/2012 | Lim |
| 2012/0289191 A1 | 11/2012 | Puura |
| 2012/0322384 A1 * | 12/2012 | Zerr .......... H04W 76/10 455/41.3 |
| 2013/0041938 A1 | 2/2013 | Lin |
| 2013/0159699 A1 | 6/2013 | Torkkel |
| 2013/0173915 A1 | 7/2013 | Haulund |
| 2013/0237190 A1 | 9/2013 | Smith |
| 2013/0268687 A1 * | 10/2013 | Schrecker .......... H04W 12/06 709/229 |
| 2013/0268758 A1 * | 10/2013 | Schrecker .......... G06F 21/00 713/168 |
| 2013/0268766 A1 * | 10/2013 | Schrecker .......... G06F 21/34 713/185 |
| 2013/0268767 A1 * | 10/2013 | Schrecker .......... G06F 21/31 713/185 |
| 2013/0268881 A1 | 10/2013 | Bartkiewicz |
| 2014/0040991 A1 | 2/2014 | Potonniee |
| 2014/0062874 A1 | 3/2014 | Suggs |
| 2014/0067678 A1 | 3/2014 | Lee |
| 2014/0108810 A1 | 4/2014 | Chenna |
| 2014/0164774 A1 | 6/2014 | Nord |
| 2014/0173695 A1 | 6/2014 | Valdivia |
| 2014/0189808 A1 | 7/2014 | Mahaffey |
| 2014/0273845 A1 | 9/2014 | Russell |
| 2014/0282846 A1 | 9/2014 | DeWeese et al. |
| 2014/0282877 A1 | 9/2014 | Mahaffey et al. |
| 2014/0298432 A1 | 10/2014 | Brown |
| 2014/0304505 A1 | 10/2014 | Dawson |
| 2014/0330560 A1 | 11/2014 | Venkatesha et al. |
| 2014/0337956 A1 | 11/2014 | Korgaonkar |
| 2014/0366123 A1 | 12/2014 | DiBona et al. |
| 2015/0074230 A1 | 3/2015 | Lee |
| 2015/0121464 A1 | 4/2015 | Hughes, Jr. |
| 2015/0121488 A1 | 4/2015 | Vaughn et al. |
| 2015/0135310 A1 | 5/2015 | Lee |
| 2015/0178721 A1 | 6/2015 | Pandiarajan |
| 2015/0270971 A1 | 9/2015 | Dietrich |
| 2015/0302856 A1 | 10/2015 | Kim et al. |
| 2015/0310452 A1 | 10/2015 | Baitch |
| 2015/0319142 A1 | 11/2015 | Herberg |
| 2015/0339870 A1 | 11/2015 | Cojocaru et al. |
| 2015/0350894 A1 | 12/2015 | Brand |
| 2015/0351038 A1 * | 12/2015 | Dooley .......... G06Q 30/0267 455/41.2 |
| 2015/0358315 A1 | 12/2015 | Cronin |
| 2016/0183164 A1 | 6/2016 | Pelkey |
| 2016/0192194 A1 | 6/2016 | Yang |
| 2016/0249158 A1 * | 8/2016 | Tredoux .......... H04L 43/16 |
| 2016/0267732 A1 | 9/2016 | Agrafioti |
| 2016/0294788 A1 | 10/2016 | Mahajan et al. |
| 2016/0360341 A1 * | 12/2016 | Srivatsa .......... H04M 1/7253 |
| 2016/0378992 A1 | 12/2016 | Nguyen |
| 2017/0201931 A1 * | 7/2017 | Swanzey .......... H04L 63/0876 |
| 2017/0213404 A1 | 7/2017 | Sivalingam |
| 2017/0237565 A1 | 8/2017 | Rommel |
| 2017/0289118 A1 | 10/2017 | Khosravi et al. |
| 2017/0311116 A1 * | 10/2017 | Aga .......... G08B 1/08 |
| 2018/0067712 A1 * | 3/2018 | Behzadi .......... G06F 3/0484 |
| 2019/0058700 A1 * | 2/2019 | Kurian .......... H04W 12/0605 |
| 2019/0096243 A1 * | 3/2019 | Doig .......... G08G 1/091 |
| 2019/0188368 A1 | 6/2019 | Hastings |
| 2019/0208421 A1 | 7/2019 | Ziraknejad et al. |

OTHER PUBLICATIONS

"Near Lock—Lock and unlock your Mac with your iPhone," Oct. 2014, [retrieved on Dec. 30, 2015]. Retrieved from the Internet: URL<http://nearlock.me/>. 6 pages.

"Near Lock—Lock and unlock your Mac with your iPhone: FAQ," Dec. 2014, [retrieved on Dec. 30, 2015]. Retrieved from the Internet: URL<http://nearlock.me/faq>. 3 pages.

Barker, Ian, 'Betanews.com,' "MicroStrategy platform Ushers in password-free security," Apr. 2015, [retrieved on Dec. 30, 2016]. Retrieved from the Internet: URL<https://betanews.com/2015/04/02/microstrategy-platform-ushers-in-password-free-security/>. 1 page.

Cahill et al., "MicroStrategy Introduces Enterprise Security Platform Usher™, Debuts Usher Software Development Kit," MicroStrategy Inc., Apr. 2015, 2 pages.

Fazackerley, Mark, "Usher Functionality," LinkedIn Corporation, Apr. 2014, retrieved from the Internet: URL<http://www.slideshare.net/markfazackerley3/usher-functionality >. 12 pages.

(56) References Cited

OTHER PUBLICATIONS

Fidoalliance.org [online]. "Mobile Connect & FIDO," GSMA, 2014, retrieved from the Internet: URL<https://fidoalliance.org/wp-content/uploads/David-Poillington-GSMA.pdf>. 11 pages.
Hellotether.com [online]. "Lock and unlock your Mac automatically with your iPhone," Fi a Fo Ltd., Dec. 2015, URL<www.hellotether.com>. 10 pages.
Kastrenakes, Jacob, "Knock app lets you unlock your Mac by tapping your iPhone," the Verge, Nov. 2013, [retrieved on Dec. 30, 2015]. Retrieved from the Internet: URL<http://www.theverge.com/2013/11/5/5069614/knock-iphone-app-wirelessly-unlocks-your-mac>. 2 pages.
Knocktounlock.com [online]. "Introducing Knock 2.0: Unlock your Mac faster and more securely than ever," Aug. 2013, [retrieved on Dec. 30, 2015]. Retrieved from the Internet: URL<http://www.knocktounlock.com>. 3 pages.
Knocktounlock.com [online]. "Knock FAQ: Faster and safer than typing a password. Just Knock. For iPhone + Mac," Nov. 2013, [retrieved on Dec. 30, 2015]. Retrieved from the Internet: URL<http://www.knocktounlock.com/faq/>. 8 pages.
Knocktounlock.com [online]. "Knock/Help: Search for answers," Mar. 2014, [retrieved on Dec. 30, 2015]. Retrieved from the Internet: URL<http://help.knocktounlock.com/>. 5 pages.
Lee, Justin, "Inside MicroStrategy's biometric mobile identity platform Usher," Biometrics Research Group, Inc., Apr. 2015, [retrieved on Dec. 30, 2016]. Retrieved from the Internet: URL<http://www.biometricupdate.com/201504/inside-microstrategys-biometric-mobile-identity-platform-usher>. 1 page.
Macrumors.com [online]. "'Knock' Aims to Let you Unlock Your Mac With Your Apple Watch," Apr. 2015, [retrieved on Dec. 30, 2015]. Retrieved from the Internet: URL<http://www.macrumors.com/2015/04/22/knock-unlock-mac-with-apple-watch/>. 8 pages.
MicroStrategy.com [online]. "Introduction to Usher," MicroStrategy Inc., Jun. 2014, retrieved from the Internet: URL<https://mobileapps.microstrategy.com/usher/MSTREmployeeFAQ/MSTREmployeeFAQ.html >. 10 pages.
MicroStrategy.com [online]. "Usher Help: Version 2.4.07," MicroStrategy Inc., 2015, retrieved from the Internet: URL<http://www2.microstrategy.com/producthelp/Usher/2.4.07/UsherHelp.pdf>. 197 pages.
MicroStrategy.com [online]. "Usher Mobile Identity Platform: Deliver biometric-caliber security across the enterprise," MicroStrategy Inc., Jan. 2014, retrieved from the Internet: URL<https://www.microstrategy.com/Strategy/media/downloads/products/usher_overview-presentation.pdf >. 24 pages.
MicroStrategyhelp.atlassian.net [online]. "Usher Security," Mar. 2016, [retrieved on Dec. 30, 2016]. Retrieved from the Internet: URl<https://microstrategyhelp.atlassian.net/wiki/display/README103/Usher+Security>. 10 pages.
Mobileconnect.io [online]. "Secure digital identity is now in your hands: Mobile Connect is a new service that lets you login to websites and apps on any device without having to remember usernames or passwords. You are safely identified through your mobile phone number," Mobile Connect, Mar. 2015, URL<https://mobileconnect.io/>. 12 pages.
Usher.com [online]. "Usher Mobile Identity Platform: Security Architecture," MicroStrategy Inc., 2014, retrieved from the Internet: URL<https://www.microstrategy.com/Strategy/media/downloads/white-papers/Usher-v2-1ArchitectureWhitepaper.pdf >. 20 pages.
Wikipedia.com [online]. "Bluetooth," Jan. 2004, [retrieved on Mar. 10, 2017]. Retrieved from the Internet: URL<https://en.wildpedia.org/wiki/Bluetooth>. 25 pages.
Wikipedia.com [online]. "Pretty Good Privacy," Jan. 2004, [retrieved on Mar. 11, 2017]. Retrieved from the Internet: URL<https://en.wikipedia.org/wiki/Pretty_Good_Privacy>. 12 pages.
Wikipedia.com [online]. "Public key infrastructure," Jan. 2004, [retrieved on Dec. 20, 2016]. Retrieved from the Internet: URL<https://en.wikipedia.org/wiki/Public_key_infrastructure>. 7 pages.
Wikipedia.com [online]. "Public-key cryptography," Jan. 2004, [retrieved on Mar. 13, 2017]. Retrieved from the Internet: URL<https://en.wikipedia.org/wiki/Public-key_cryptography>. 16 pages.
Wikipedia.com [online]. "Security Assertion Markup Language," Nov. 2016, retrieved from the Internet: URL<https://en.wikipedia.org/wiki/Security_Assertion_Markup_Language>. 5 pages.
Wikipedia.com [online]. "Security token," Apr. 2005, [retrieved on Feb. 18, 2017]. Retrieved from the Internet: URL<https://en.wikipedia.org/wiki/Security_token>. 8 pages.
Jansen et al., "Proximity-based Authentication for Mobile Devices," Proceedings of the 2005 International Conference on Security and Management, pp. 398-404, Jun. 20, 2005.
Jaros et al., "A New Approach in a Multifactor Authentication and Location-based Authorization," ICIMP 2011: The Sixth International Conference on Internet Monitoring and Protection, pp. 50-53, Mar. 20, 2011.
Bertino et al., "Location-Aware Authentication and Access Control—Concepts and Issues," 2009 International Conference on Advanced Information Networking and Applications, 2009, pp. 10-15.
"The Usher Identity Platform: A description of MicroStrategy's mobile identity solution," Usher by MicroStrategy, Apr. 17, 2014, 15 pages.
"Usher Mobile Identity Platform: Deliver biometric-caliber security across the enterprise," Usher by MicroStrategy, Jan. 11, 2014, 24 pages.
"Usher Mobile Identity Platform: Security Architecture," Usher by MicroStrategy, Jul. 23, 2014, 20 pages.
"Apple Watch Programming Guide," Apple.com, Mar. 9, 2015, 81 pages.
"Apple Watch User Guide, Version 1.0," Apple.com, Apr. 23, 2015, 96 pages.
"Availability of two-factor authentication in iOS 9 and OS X El Capitan," Apple.com, Apr. 5, 2016, URL<https://support.apple.com/en-us/HT205075>, 3 pages.
"Google Nexus Unlock," Google Support, accessed on Apr. 19, 2016, URL<https://support.google.com/nexus/answer/6093922>, 7 pages.
"With a Flick of the Wrist, Security Just Got Even Easier," Duo Security Blog, May 5, 2015, URL<https://duo.com/blog/duo-for-apple-watch>, 10 pages.
Buckley, "Here's the Official Apple Watch User Guide," Gizmodo, Apr. 23, 2015, URL<http://gizmodo.com/heres-the-official-apple-watch-user-guide-1699820199>, 2 pages.
Hall, "Apple Watch uses constant skin contact to validate Apple Pay purchases," 9to5Mac, Sep. 10, 2014, URL<http://9to5mac.com/2014/09/10/apple-watch-uses-constant-skin-contact-to-validate-apple-pay-purchases/>, 9 pages.
Lee, "Apple Watch Will Use Skin Contact to Authenticate Contactless Payments," Ubergizmo, Sep. 10, 2014, URL<http://www.ubergizmo.com/2014/09/apple-watch-will-use-skin-contact-to-authenticate-contactless-payments/>, 2 pages.
Miners, "5 things the Apple Watch can do, and 5 things it can't," PCWorld, Sep. 10, 2014, URL<http://www.pcworld.com/article/2605140/5-things-the-apple-watch-can-and-cant-do.html>, 6 pages.
United States Office Action in U.S. Appl. No. 15/427,684, dated Nov. 17, 2017, 31 pages.
United States Office Action in U.S. Appl. No. 15/427,684, dated Mar. 13, 2018, 32 pages.
United States Office Action in U.S. Appl. No. 14/793,186, dated Nov. 22, 2017, 21 pages.
Kannbourakis et al., "Using SSL/TLS in Authentication and Key Agreement Procedures of Future Mobile Networks," 4$^{th}$ International Workshop on Mobile and Wireless Communications, Sep. 9-11, 2002, 5 pages.
Ho and Liu, "On-demand QoS-based Routing Protocol for Ad Hoc Mobile Wireless Networks," Fifth IEEE Symposium on Computers and Communications, Proceedings ISCC 2000, Jul. 3-6, 2000, 6 pages.
Nam et al. Security Enhancement to a Password-Authenticated Group Key Exchange Protocol for Mobile Ad-Hoc Networks. IEEE Communications Letters, vol. 12, Issue: 2., dated Feb. 2008, 3 pages.

(56) References Cited

OTHER PUBLICATIONS

Qi-Na et al. "The implementation of FPGA-based RSA public-key algorithm and its application in mobile-phone SMS encryption system," 2011 First International Conference on Instrumentation, Measurement, Computer, Communication and Control, year 2011, 4 pages.

Tsai et al. "High-efficient Multi-Key Exchange Protocol based on Three-party Authentication," 2014 Eighth International Conference on Innovative Mobile and Internet Services in Ubiquitous Computing, year 2014, 6 pages.

United States Office Action in U.S. Appl. No. 14/793,186, dated Sep. 26, 2018, 19 pages.

Shah et al., "Wi-Auth: WiFi based Second Factor User Authentication", Proceedings of the 14th EAI International Conference on Mobile and Ubiquitous Systems: Computing. Networking and Services, Nov. 2017, 393-402.

* cited by examiner

PROXIMITY-BASED USER AUTHENTICATION

CROSS-REFERENCE TO RELATED APPLICATIONS

This application claims priority to U.S. Application Ser. No. 62/486,321, filed on Apr. 17, 2017, which is incorporated by reference herein in its entirety.

TECHNICAL FIELD

This specification generally relates to user authentication systems.

BACKGROUND

Many devices require authentication of a user before access is granted. For example, computers or phones may require a user to enter a password or code to obtain access.

SUMMARY

In some implementations, a system is capable of automatically authenticating a user without requiring the user to provide input after the user attempts to access a secured resource on a client device. The system can authenticate the user based on a detected proximity between the client device and a mobile device that has been designated as an authentication token for the user. For example, the client device can detect when the mobile device moves into a predetermined level of proximity of the client device, e.g., when the mobile device and the client device establish wireless communication. The client device can also detect when the mobile device moves out of the predetermined level of proximity, e.g., when the wireless communication ends or when signal strength is below a threshold. In some instances, the user may be automatically authenticated based on the mobile device being within the predetermined level of proximity of the client device, without requiring a user to enter a password, biometric input, or other proof of identity.

The client device can inform a server system whether an authorized mobile device is in proximity to the client device. For example, each time the mobile device enters proximity or leaves proximity, the client device can notify the server system. This allows the server system to maintain up-to-date records, on an ongoing basis, indicating whether the mobile device is in an appropriate level of proximity to the client device to justify authenticating the user. The records can be maintained to indicate the current "state" of the client device, so the server system has information about the status of the client device with respect to any authorized authentication tokens at any given time. With these records, the server system can make authentication decisions with very low latency. For example, if the client device requests access to a resource requiring authentication, and the server system's records indicate that the mobile device is currently in proximity of the client device, the server system need not wait for additional communications to grant access. In particular, the user does not experience delays that could occur due to the client device or mobile device searching for nearby devices, or delays for the server system to query the client device or mobile device about their status. The server system's records reflect a determination of proximity between the client device and mobile device that was made and indicated to the server system before the user's access attempt, so at least in some implementations, no verification of proximity may be needed after the user attempts access.

In some implementations, the client device detects a connection event indicating wireless communication between the client device and the mobile device. The client device transmits a message indicating the detected connection event to the server system. The server system uses the message to update records indicating the current status of the client device. After the status has been updated, the client device receives data indicating an attempt from a user to access a resource using the client device. The client device transmits an authentication request identifying the access attempt to the server system. The server system determines that conditions for access have been satisfied based on the updated status of the client device, e.g., which indicates that the mobile device is within an appropriate level of proximity to the client device. The server system transmits an access approval indication to the client device that instructs the client device to automatically authenticate the user and grant access to the resource.

In the example above, the mobile device can be a trusted device that is used to verify the identity of the user that submits the access attempt on the client device. The trusted device can be a device that is previously associated with an authentication token used to authenticate a user when verification is needed. In this manner, the system uses a close detected proximity of the trusted device and the client device to verify the identity of the user that submits an access attempt. Thus, while the trusted device is located nearby the client device, the system can determine that the user that submits the access attempt is a verified user, and as a result, remove the need to request the user to provide credential information to verify his/her identity.

The architecture of the system provides various advantages in allowing the user to access secured resources on the client device. For example, the user can be provided access without having to submit any input because a sufficient proximity level (e.g., a detected proximity level that satisfies a predetermined level of proximity) of the mobile device can be used to verify access conditions for a resource. In addition, the system can provide access to the user without incurring delays associated with contacting the mobile device to perform authentication, or requiring proximity to be checked at the time when the user attempts to access the secured resource. In this regard, the system is capable of authenticating the user without requiring the mobile device to have network connectivity, and without verifying its location so long as the client device determines that the mobile device is located within the predetermined level of proximity.

In one general aspect, a method is performed by a mobile electronic device. The method includes: detecting, by a client device, that a second device that has been designated as an authentication token for a user is within a predetermined level of proximity of the client device; in response to detecting that the second device is within the predetermined level of proximity to the client device, sending, by the client device and to a server system, data indicating that the second device is within the predetermined level of proximity of the client device; receiving, by the client device, data indicating an attempt to access a resource using the client device while the second device is within the predetermined level of proximity to the client device; in response to receiving the data indicating the access attempt, sending, by the client device, an authentication request to the server system; receiving, by the client device and from the server system, data indicating approval of the authentication request; and providing, by the client device, access to the resource based on receiving the data indicating approval of the authentication request.

Implementations can include the following optional features. For example, in some implementations, the data indicating the attempt to access the resource is received after the client device sends, to the server system, the data indicating that the second device is within a predetermined level of proximity of the client device. In such implementations, receiving the data indicating approval of the authentication request includes receiving an indication of approval of the authentication request that the server system provided based on the data indicating that the second device is within the predetermined level of proximity of the client device.

In some implementations, access to the resource is provided without requiring user input to the client device or the second device following the attempt to access the resource, and without requiring communication between the server system and the second device following the attempt to access the resource.

In some implementations, the method further includes: determining, by the client device, that the second device is no longer within the predetermined level of proximity of the client device; and in response to determining that the second device is no longer within the predetermined level of proximity of the client device, sending, by the client device to the server system, a message indicating that the second device is no longer within the predetermined level of proximity of the client device.

In some implementations, the method further includes: receiving, by the client device, an access revocation indication provided in response to the message indicating that the second device is no longer within the predetermined level of proximity of the client device, the access revocation indication indicating that authentication for access to the resource has been revoked; and terminating access to the resource using the client device.

In some implementations, detecting that the second device that has been designated as an authentication token for a user is within the predetermined level of proximity of the client device includes: receiving a communication from the second device over a direct, wireless radio-frequency communication channel.

In some implementations, detecting that the second device that has been designated as an authentication token for a user is within the predetermined level of proximity of the client device includes determining that the second device is within the predetermined level of proximity based on determining that a signal strength of the communication from the second device satisfies a signal strength threshold.

In some implementations, the method further includes: before detecting that the second device is within the predetermined level of proximity, storing, in data storage of the client device, data indicating that the second device has been designated as an authentication token for the user. In such implementations, detecting that the second device that has been designated as an authentication token for a user is within the predetermined level of proximity of the client device includes: receiving, by the client device, a communication from another device; and based on the communication from the device, determining, by the client device, that the other device is the second device identified in the stored data in the data storage of the client device.

In some implementations, receiving data indicating an attempt to access a resource using the client device includes receiving data indicating an attempt to access a file, a local application, a remote application, a web page, a virtual private network (VPN), a network resource, or a database.

In some implementations, receiving data indicating an attempt to access a resource using the client device includes receiving data indicating user input to navigate to a web page, open a bookmark of a web browser, select an icon, or open an application.

In some implementations, detecting that the second device is within the predetermined level of proximity of the first device includes verifying and identity of the second device based on a device identifier provided by the second device or an encryption key used by the second device.

In some implementations, the second device is a mobile phone.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, a system allows user to automatically access to a secured resource on a client device using a mobile device that is designated as an authentication token for the user. The system can enable automatic access when the mobile device is within a predetermined level of proximity to the client device, which is indicated by a detected connection event between the client device and the mobile device. The client device may inform an associated server of the detected connection event, which configures the client device to provide automatic access to the secured resource. When the user attempts to access the secured resource, the system provides access to the user without requiring user input for authentication, and without incurring the delay of contacting the mobile device or requiring proximity to be checked at the time of the access attempt.

As described herein, a "resource" refers to any type of electronic content that can be accessed by a user on a client device. A resource can be secured such that the user's access to the resource is limited or restricted based on the occurrence of certain conditions. For example, access to the resource can be limited to a specific user, or to a user that provides information verifying that he/she has the authority to access the content. Examples of resources include a file that is opened on the client device, a local application that runs on the client device, a web page that is opened through a browser of the client device, a virtual private network (VPN), a network resource, or the contents of a database, among others.

As described herein, an "access attempt" refers to any type of user input that indicates that a user is trying to access a secured resource on a client device. Examples of access attempts can include a user input to navigate to a web page, opening a bookmark of a web browser that runs on a client device, selecting an icon of an application or a file, or executing a command to run an application, open a file, or query data from a database.

Figure 1A:
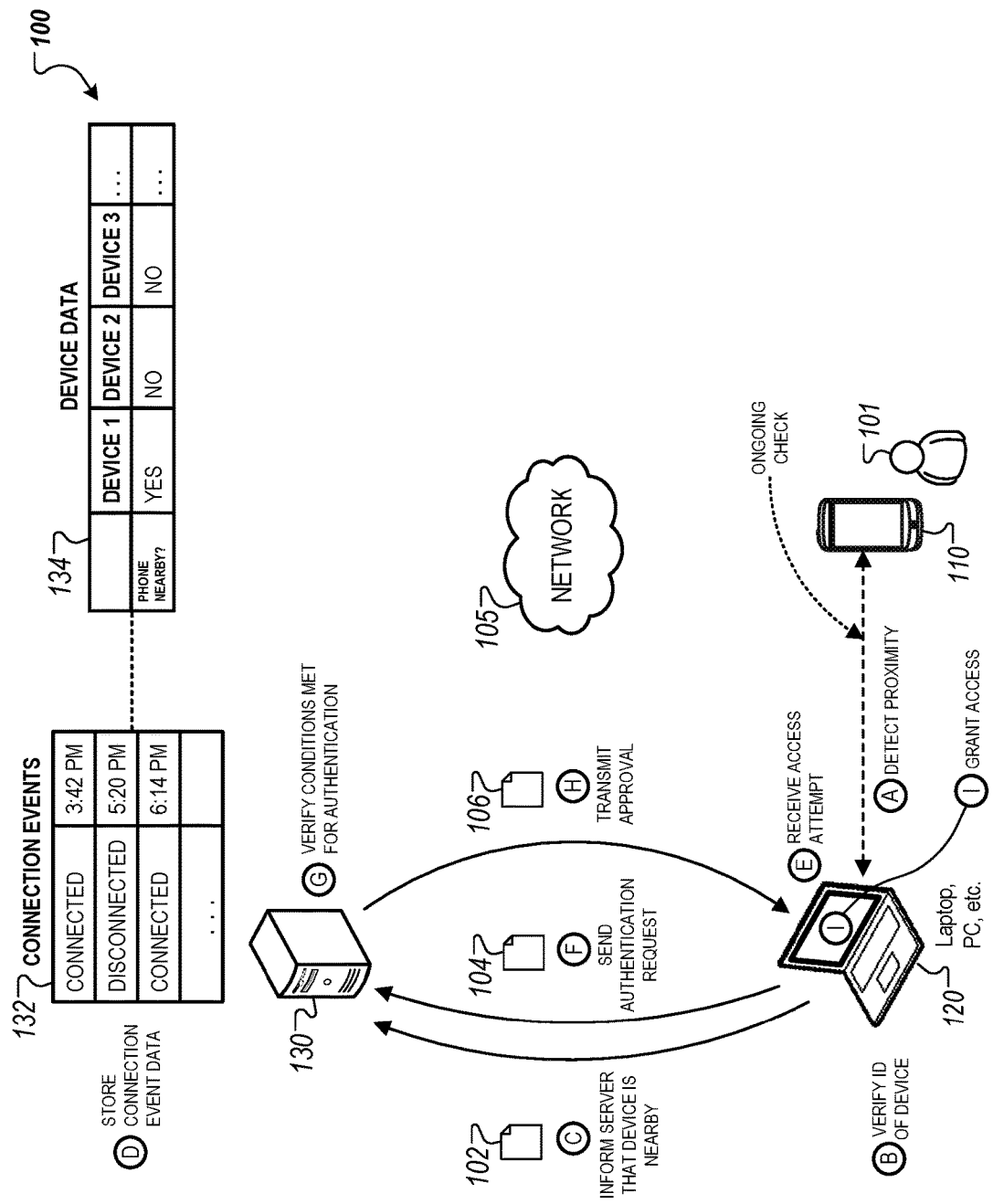
FIGS. 1A-1C are diagrams that illustrate examples of connection scenarios relating to proximity-based automatic user authentication.
Figure 1B:
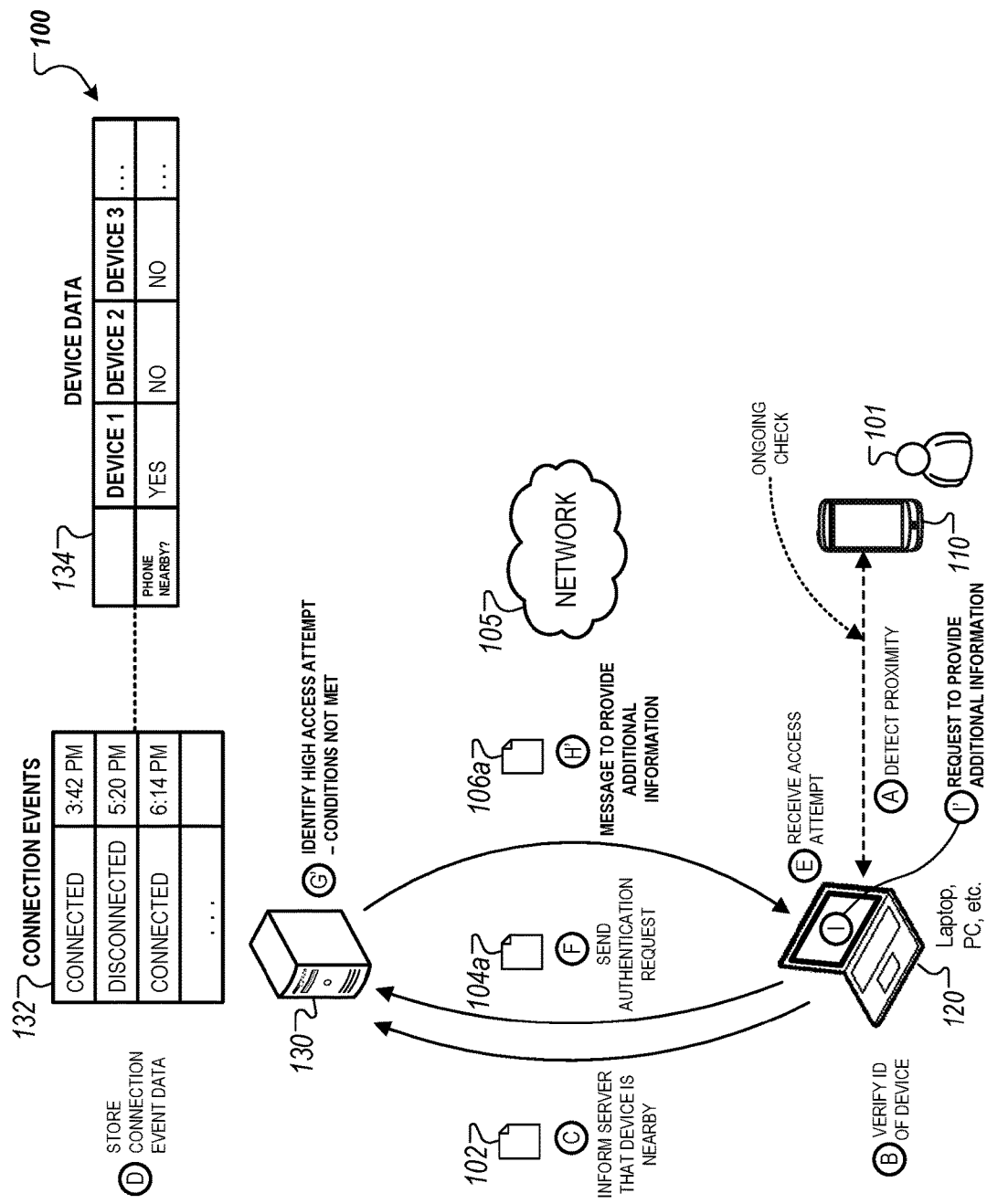
Figure 1C:
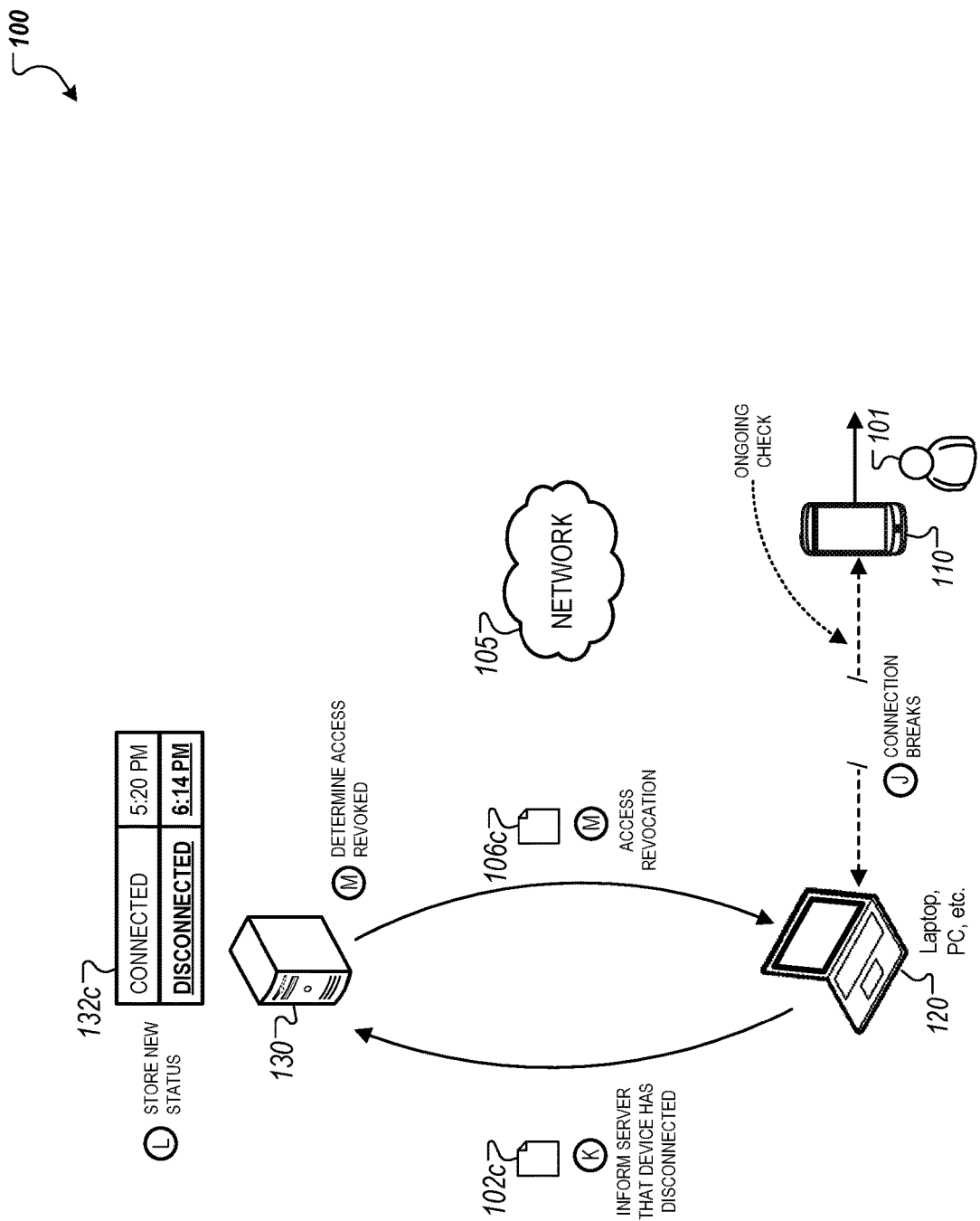

FIGS. 1A-1C are diagrams that illustrate examples of a system 100 for providing proximity-based authentication in different connection scenarios. The system 100 includes a client device 120, such as a personal computer or other device, a mobile device 110, such as a mobile phone of a user 101, and a server system 130 that is associated with the mobile device 110.

The mobile device 110 can be a trusted device associated with the user 101. For example, the mobile device 110 can be a device that has been previously verified by the server system 130 and/or the resource system 120 and assigned an authentication token for the user 101 by a credential authority. In other implementations, the mobile device 110 can instead be a device that is designated as an authentication token for the user 101 but not previously verified by the sever system 130 and/or the client device 120 (e.g., not a trusted device). For example, in such implementations, device information for the mobile device 110 can be provided to the server system 130 by a credential authority that designates the mobile device 110 as an authentication token for the user 101. The server system 130 and/or the client device 120 can then use the device information to identify the identity of the mobile device 110.

Referring initially to the example depicted in FIG. 1A, a user of the mobile device 110 has previously associated or registered the mobile device 110 as a security token to be used for gaining access to the client device 120.

In stage (A), the mobile device 110 establishes a connection event with the client device 120 when the mobile device 110 is brought within a physical proximity to the client device 120. The connection event can refer an indication that the mobile device 110 and the client device 120 has established a verified connection with one another. For example, the client device 120 and/or the mobile device 110 may identify the occurrence of a connection event when it has connected to a previously paired or associated device. The connection can be made using any type of suitable wired or wireless connection (e.g., a Bluetooth pairing event, an infrared connection, a near-field communication (NFC) connection event, etc.) indicating that the mobile device 110 is within a physical proximity to the client device 120.

In further detail, the mobile device 110 and the client device 120 communicate using a short-range wireless communication link, such as a direct wireless radiofrequency (RF) communication link between the devices 110, 120. Examples include wireless personal area networks, communications according to IEEE 802.15, and Bluetooth, e.g., communication using IEEE 802.15.1 protocols or other Bluetooth standards. Other types of wireless links, such as IEEE 802.11 or WI-FI communication, may additionally, or alternatively, be used. In general, a direct communication link between the devices 110, 120 is used and signal strength over the wireless communication link is used as an indicator of distance between the devices 110, 120.

Other techniques for determining distance between devices, including GPS location tracking and WI-FI triangulation, can additionally, or alternatively, be used to determine proximity of one device to another. In some implementations, the devices 110, 120 may communicate over multiple wireless communication links, concurrently or at different times, and the techniques discussed herein may be performed using any or all of the links.

The mobile device 110 and the client device 120, in the example depicted, have previously been associated, e.g., paired or bonded using Bluetooth, and the mobile device 110 has been designated to represent an authentication factor for obtaining access to the client device 120. In some implementations, simply pairing the devices 110, 120 is not sufficient to establish the device 110 as an authentication token for automatic access to the client device 120. For example, the user may be required to affirmatively indicate that the device 110 serves as an authentication factor. As another example, a user agent executing on the client device 120 may be involved in a pairing process specifically for establishing the device 110 as an authentication factor for the client device 120.

As a result of the pairing, the mobile device 110 and the client device 120 may store identifiers that allows the devices to identify each other. Similarly, the device 110 and the client device 120 may store encryption keys or shared secret information (e.g., a unique link key corresponding to the pairing of the mobile device 110 with the client device 120) allowing the devices to communicate securely or establish their identity to each other.

For example, the mobile device 110 can periodically send signals, such as beacon messages, over the link (e.g., each second, every 5 seconds, every 15 seconds, or at another interval). The signals can include information that identifies the device 110, for example, a MAC address or other device identifier. The client device 120 may also send periodic signals to identify itself. As the mobile device 110 comes near to the client device 120, the devices 110, 120 can identify each other from the periodic signals and establish secure communication using the data stored from pairing. For example, the device's 110 ability to communicate with the client device 120 using the link established previously, during Bluetooth pairing, can demonstrate that the mobile device 110 is the device that the user previously designated as an authentication token.

In stage (B), the client device 120 verifies a device identifier of the mobile device 110 to confirm that the connected device actually represents the mobile device 110. For example, the client device 120 may determine if a device identifier of the mobile device 110 has been previously associated or registered with a security token to be used for granting access to the client device 120.

The client device 120 automatically transmits the message 102 to the server system 130 after establishing a connection to the mobile device 110. The server system 130 can then update stored records associated with the client device 120 that track connection and disconnection events with the mobile device 110 (e.g., the connection event data 132). For example, based on the stored records of which pairing links or devices represent authentication tokens, the server system 130 can determine if the mobile device 110 represents a valid authentication token. The server system 130 can also determine whether the mobile device 110 is located sufficiently close to the client device 120 to initiate the verification process for an access attempt. As described throughout, the mobile device 110 may be considered to be within sufficient proximity to the client device 120 when a device or measure indicative of distance satisfies a predetermined threshold.

For example, the server system 130 and/or the client device 120 may determine that sufficient proximity has been achieved when transmissions from the mobile device 110 have at least a minimum received signal strength at the client device 120. The minimum signal strength can be set as a default of the system, or may be based on hardware capabilities of the devices 110, 120 (e.g., known information about the device model numbers, antennas or radio modules used, transmission powers and reception gain, and so on), and/or data indicating current configurations or settings of the devices 110, 120. Measurements of actual signal strengths detected at different distances can be set through a calibration process, so the signal strength that appears at a particular distance can be measured. As another example, proximity can be determined to be achieved when other indicators of distance indicate that the distance satisfies a threshold. For example, GPS data or WI-FI triangulation data for one or both devices 110, 120 can be used to verify that the distance between the devices 110, 120 is less than or equal to a maximum distance threshold.

In stage (C), the client device 120 transmits a message 102 to the server system 130 indicating that the mobile device 110 is detected to be within a physical proximity to the client device 120. The physical proximity can be determined based on a recently detected connection event between the mobile device 110 and the client device 120 as described above.

In stage (D), the server system 130 updates connection event data 132 associated with the mobile device 110 to include the recently connection event that is indicated within the message 102. The connection event data 132 can specify time points associated with connection events (e.g., a time point when the client device 120 establishes connectivity to the mobile device 110) and time points associated with disconnection events (e.g., a time point when the client device 120 losses connectivity to the mobile device 110). In these examples, the server 130 and/or the client device 120 can use a time period between a connection event and a disconnection event to determine when the mobile device 110 is currently within a physical proximity to the client device 120. For example, during these time periods, the client device 120 may periodically check a connection status of a recently established connection event with the mobile device 110 to verify that the mobile device 110 remains within the physical proximity to the client device 120.

The server system 130 can use device data 134 to determine a device that is identified within the message 102 if the user 101 is associated with multiple devices that are each associated with a different authorization token. In such instances, each of the multiple devices can be used to provide a different type of access on the client device 120. For example, the authorization token for the mobile device 110 can be used to provide a certain type of access, whereas a second device of the user 101 can provide a different type of access (e.g., access to different resources on the client device 120, or different conditions or policies for providing access). The server system 130 uses the device data 134 to identify a particular device from among the multiple devices of the user 101 that has been determined by the client device 120 to be within the predetermined proximity level of the client device 120.

Once connected to the mobile device 110, the client device 120 receives an access attempt by the user 101, which is depicted in the figure as step "(E)." The access attempt can be type of action performed on the client device 120 that requires the verification of a credential. For example, an access attempt be represent username and password input on the client device 120. The access attempt can additionally be associated with authentication for an operating system of the client device 120 (e.g., a desktop login), authentication for an application that runs on the client device 120, or authentication for a webpage that is access through a browser of the client device 120.

The access attempt can be associated with various types of user inputs in relation to different resources. In some implementations, the data indicating an attempt to access a resource includes receiving data indicating an attempt to access a file, a local application, a remote application, a web page, a VPN, a network resource, or a database. In other implementations, the data indicating an attempt to access a resource using the client device 120 includes receiving data indicating a user input to navigate a web page, open a bookmark of a web browser, select an icon, or open an application.

In stage (F), the client device 120 transmits an authentication request 104 for the received access attempt to the server system 130. The authentication request 104 can include information associated with the access attempt received on the client device 120. For example, the authentication request 104 can indicate a particular resource that the user 101 has attempted to access on the client device 120, context data associated with the access attempt (e.g., time associated with the access attempt, background processes currently running on the client device 120, etc.). The server system 130 can use the information included within the authentication request 104 to determine if the conditions for authentication have been satisfied, as described below.

The server system 130 determines whether to provide access to the client device 120. As part of determining whether to provide access, the server system 130 may identify a credential associated with the access attempt that has been designated for the association between the mobile device 110 and the client device 120.

In stage (G), the server system 130 may evaluate various factors relating to the identified credential to determine whether automated access to the client device 120 should be granted. For example, the server system 130 may determine whether the user 101 is associated with the credential whether the credential is still currently valid, whether any policies for use of the credential are applicable, and whether policies of the credential would disallow automatic access based on the proximity of the mobile device 110.

The factors used by the server system 130 to determine if conditions to provide automated access to the client device 120 can relate to a credential of the user 101. The association (e.g., pairing) of the mobile device 110 with the client device 120 can be linked to a specific credential that has been issued to the user 101 by a credential authority associated with the server system 130. The credential may include have associated rules, policies, or conditions, which may be required to be satisfied for the proximity of the mobile device 110 to be used as an authentication factor. These conditions can set requirements or restrictions on use of the credential. In some implementations, these conditions can be separate from, and be imposed in addition to, requirements that the credential be non-revoked and non-expired in order to be used. The server system 130 may look up, from stored data at the client device 120 and/or the server system 130, data that identifies the credential associated with the device 110 and its paired link with the client device 120. The resourced device 130 may also determine, from stored data or from data requested from a server system, the conditions on use of the credential. Since the requirements for use of the credential may change, the server system 130 may verify them for a credential authority each time that proximity-based access is initiated. For example, the server system 130 may verify the requirements each time it receives the authentication request 104 from the client device 120. In some implementations, this verification can include verifying that the credential has not been revoked and/or is not expired.

In stage (H), if the server system 130 determines that conditions are met for providing automatic access to the client device 120, the server system 130 transmits an access approval indication 106 to the client device 120. In response to receiving the approval notification, the client device 120 grants automated access to content associated with the access attempt (e.g., an application, a webpage, or an operating system feature requiring user authentication using the credential). In this regard, the automated access grant can be used to provide access to the client device 120 without requiring the user 101 to provide submit the credential for verification.

In the example depicted in FIG. 1A, automatic access to the client device 120 is provided only when the mobile device 110 is within a physical proximity to the client device 120. After an initial connection event between the mobile device 110 and the client device 120, the connection between the devices can be periodically (or continuously) checked to determine if the mobile device 110 is still within a physical proximity of the client device 120.

In addition, the client device 120 transmits the message 102 to the server system 130 each time after detected connection and disconnection events with the mobile device 110. The server system 130 is constantly aware of the connectivity state between the mobile device 110 and the client device 120, and can verify the conditions associated with a credential without having to query the client device 120 and/or the mobile device 110. The server system 130 can additionally provide automated access to the client device 120 without requiring the mobile device 110 to have network connectivity during an access attempt.

Referring now to FIG. 1B, an example of a connection scenario for a heighted access attempt is illustrated. The system 100 initially performs the operations described above with respect to steps "(A)" to "(F)." In this example, however, at stage (G'), the server system 130 evaluates the factors relating to the identified credential and determines that the conditions have not been met.

The server system 130 can determine that the conditions have not been met because the authentication request 104a received from the client device 120 is one that involves a credential that requires additional verification. For example, the authentication request 104a can relate to an access attempt that provides access to highly confidential personal information such as financial information, a social security number, among others, on the client device 120. In other examples, the access attempt may relate to a credential that is designated to have higher security verification factors to be performed by the server system 130. For instance, a credential provider may require the server system 130 and the client device 120 to perform a two-factor authentication using the credential in order to provide automated access.

At stage (H'), the server system 130 transmits a message 106a to the client device 120. The message 106a can instruct the client device 120 to collect additional information from the user 101 to verify the access attempt. At stage (I'), the client device 120 provides a user interface for output to the user 101. The user interface may allow the user 101 to provide credential information that enables the system to perform a secondary verification of the credential associated with the access attempt. As examples, the credential information can include one or more of a biometric input, a specified answer to a predetermined security question, a submission of a received verification code, or other types of information that is predetermined to be associated with the credential at the server system 130.

Referring now to FIG. 1C, an example of a disconnection event is illustrated. In this example, the mobile device 110 is moved such that it is no longer within a predetermined proximity to the client device. For example, the mobile device 110 can be moved until it is located outside a detectable region of the client device 120 (e.g., to a location outside a proximity threshold of the client device 120).

At stage (J), the client device 120 determines that the mobile device 110 is no longer within the predetermined level of proximity of the client device 120. In response, the client device 120 transmits a message 102c to the server system 130 indicating that the mobile device 110 is no longer within the predetermined level of proximity of the client device 120.

The server system 130 updates connection event data 132 associated with the mobile device 110 to include the disconnection event detected indicated within the message 102c. In the example depicted, the server system 130 updates the connection event data 132 to indicate that the current status of the mobile device 110 is "DISCONNECTED."

At stage (M), the server system 130 then transmits an access revocation indication 106c to the client device 120. The access revocation indication 106c indicates that the authentication for access to the resource on the client device 120 has been terminated because the mobile device 110 is no longer within its predetermined level of proximity.

The client device 120 terminates automatic access to the resource such it is prevented from automatically providing access to the user 101 (or any other user) during a subsequently received access attempt when the mobile device 110 is not within the predetermined level of proximity of the client device 120. In these instances, the client device 120 may either request a user that submits the access attempt provide a user input to verify his/her identity through an alternative means (e.g., submit a user password). In other examples, the client device 120 may prevent access to the resource entirely until a connection event with the mobile device 110 is detected. In some other examples, the client device 120 and/or the server system 130 may, during time periods when the mobile device 110 is outside of the predetermined level of proximity of the client device 120, require a user to submit additional credential information to obtain access to the resource in a manner similar to the heighted access attempt as described above with respect to FIG. 1B.

For simplicity in illustration and description, the client device 120 is shown and sometimes described as a computer with respect to FIGS. 1A-1C. However, the client device 120 that is accessed is not limited to a computer and can be any appropriate electronic device. The client device 120 can be configured to perform the operations provide proximity-based access, including desktop computers, laptop computers, tablet computers, wearable computers, appliances (e.g., dishwasher, clothes washing machine, oven, etc.) vehicles, machinery, power tools, entertainment devices (e.g., television, projector, stereo system, video game system, etc.), electronic locks, electronic doors, home automation systems, security systems, and so on. Similarly, the mobile device 110 is not limited to a mobile phone, and may be any appropriate electronic device, such as a tablet computer, a watch, a necklace, a bracelet, a wearable device, and so on.

In addition, a single user 101 is illustrated in FIGS. 1A-1C for simplicity, but in other implementations, the system can also be configured to perform operations described above with mobile devices of multiple users. For example, the server system 130 can include a credential repository that stores data indicating credentials associated with each user, and mobile devices associated with each credential. In this example, the server system 130 can use a device identifier of a mobile device that is identified by the client device 120 during a connection event to determine a corresponding credential and a user of the mobile device. The server system 130 can then use the credential to determine an access level for the user on the client device 120 (e.g., a list of resources that the user is permitted to access through the client device 120).

Figure 2:
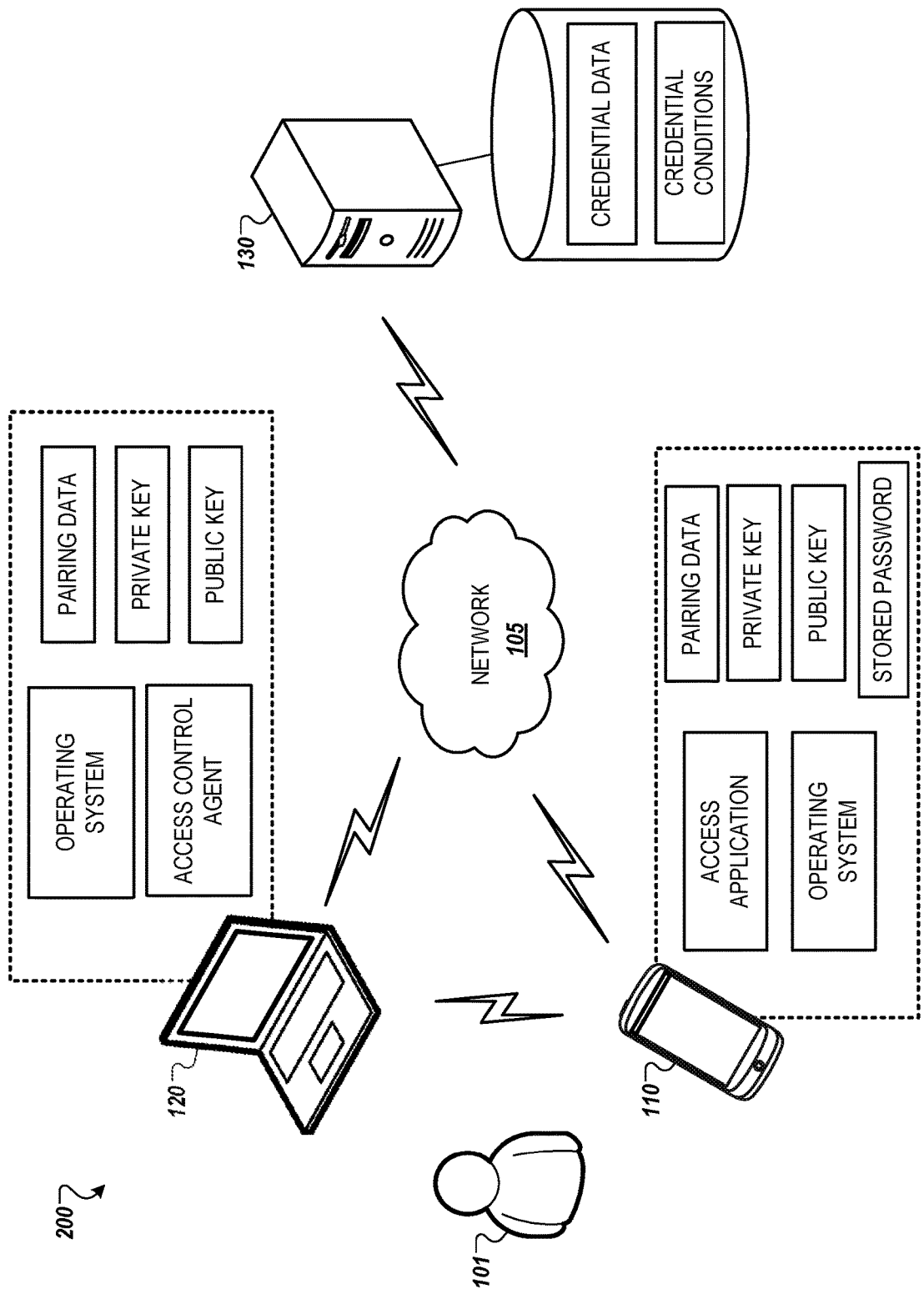
FIG. 2 is a block diagram that illustrates an example of a system that is capable of automatically providing a user with access to a resource.

FIG. 2 illustrates an example of a system 200 that shows additional detail for implementing proximity-based automatic user authentication. As illustrated, the mobile device 110 and the client device 120 may communicate with the server system 130 over the network 105, which may include public and/or private networks and may include the Internet. The server system 130 has access to credential data indicating the status of credentials and credential conditions indicating limitations and policies associated with credentials. The server system 130 can provide the devices 110, 120 information about the limitations on using a particular user's credential, and can provide data indicating whether a particular credential is still valid. The server system 130 may represent one or more computers, which may be in the same location or distributed across multiple locations.

The client device 120 has an operating system and access control agent software that execute on the client device 120. The operating system may delegate the ability to enter a password to the access control agent. For example, when appropriate, the access control agent can provide a password for the resource, e.g., through an API or other interface, and request that the resource provide access in response. The client device 120 can also store other data including encryption keys and pairing data. The pairing data can indicate previously paired devices, the credentials used to pair them or register them with the access control agent, and specific encryption keys to use with each paired device.

The mobile device 110 has an operating system and also runs an access application. For example, the access application can manage or provide access to credentials of the user 101 of the mobile device 110. As a result of setting up the device as an authentication factor for accessing the client device 120, the mobile device 110 can store, for example, pairing data, encryption keys, and a stored password that provides access to the client device 120. The pairing data can include, beyond typical pairing indicating a connection between devices, an indication of the credential associated with the pairing with each specific device that the mobile device 110 is paired with. The stored password may be stored in an encrypted form on the mobile device for safekeeping.

In some implementations, the encryption keys stored and designated for the particular pairing of the devices 110, 120 are separate from Bluetooth link keys or other encryption keys used for the communication interface. They may allow additional encryption of communications beyond link-level encryption to establish a secure association. While Bluetooth provides an operating system-level or device level link, these additional encryption keys, used by the access control agent and access application, respectively, provide an additional level of encryption. In some instances, these additional keys are used to encrypt certain portions of messages, such as a password transferred from the device 110 to the client device 120, rather than entire messages.

Figure 3:
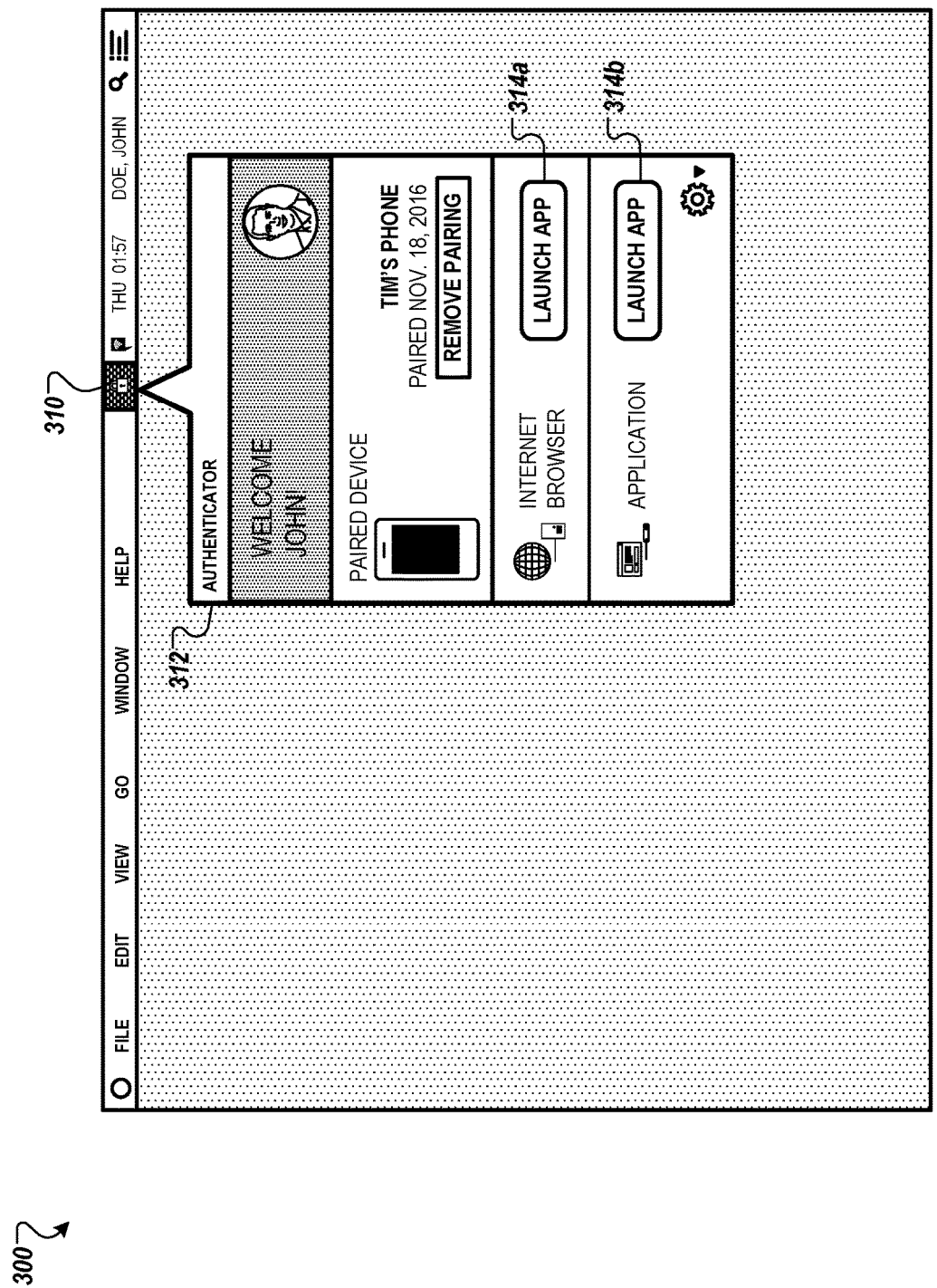
FIG. 3 is a diagram that illustrates an example of a user interface that automatically provides a user with access to a resource.

FIG. 3 is a diagram that illustrates an example of a user interface 300 that can automatically provide a user with access to a resource. The interface 300 is provided on a client device 120 that the user can use to access the resource. The interface 300 enables a user (e.g., the user 101) to automatically access a resource such as an application or a web page on a web browser without the user having to enter credential information to authenticate the user.

In the example depicted, the interface 300 is a desktop interface that is provided for output on a client device 120 such as a laptop-computing device or a desktop computing device. An icon 310 can be included on the user interface that a user can interact with to cause the client device 120 to display a list of resources that the user can access automatically when proximity of an appropriate device is nearby. The icon 310 is selectable by a user, and the client device 120 displays a window 312 when the user selects the icon 310. The window 312 can serve as a quick launch menu or launch screen that provides controls that the user can interact with to initiate access to any of various resources that can be authenticated based on proximity verification. In some implementations, the icon 310 is persistent on a user interface, whether or not an appropriate authentication device is nearby.

In some implementations, when a mobile device that has been designated as an authentication token for the user (e.g., the mobile device 110) comes within a predetermined level of proximity to the client device 120, the interface 300 adds the icon 310 for display on a taskbar of the interface 300. The icon 310 can be added on the user interface 300 without any intervention by the user. In response to detecting that the mobile device 110 is within the predetermined level of proximity, the client device 120 can use an indicated device identifier to determine that the mobile device 110 is a trusted device. For example, the client device 120 can determine if the mobile device that has been previously paired with the client device 120 and/or has been previously been designated by the server system 130 as an authentication token for the user. Once the mobile device has been determined to a trusted device, the client device 120 can execute instructions that automatically configure an application and/or an operating system of the client device 120 to display the icon 130.

The window 312 identifies a connection event between the client device 120 and the mobile device, which is indicated as a "PAIRED DEVICE" in the figure. As described above, a connection event occurs when the presence of the mobile device is detected by the client device 120 once the mobile device is located within the predetermined level of proximity of the client device 120. The client device 120 and the mobile device can be paired automatically (e.g., using a Bluetooth pairing), or based on a user input provided on either the client device 120 or the mobile device.

The window 312 also provides the user with the ability to automatically access resources on the client device 120. In the example depicted, the window 312 allows the user to access a secure web page on a browser of the client device 120 by interacting with a button 314a or other control. The window 312 also allows the user to connect to a virtual private network (VPN) by interacting with a button 314b or other control. In both of these examples, the user can access the resource (e.g., the web page, the VPN) without having to enter credential information (e.g., a username, password, etc.) or otherwise enter proof of identity to the client device 120 or the mobile device 110. As described above, the user can be automatically authenticated prior an access attempt because the mobile device is paired with the client device 120 and serves as an authentication token to authenticate the user without requiring the user to provide credential information.

The resources that the user accesses through the window 312 can be dynamically selected by the client device 120. For example, the client device 120 and/or the server system 130 can automatically determine which resources to indicate in the window 312 based on the authentication token for the user. In this example, the authentication token (e.g., device 110) is detected, and the credential used for its association with the client device 120 (e.g., an employee badge) can be used to select which resources could be automatically authenticated and accessed using the client device 120 when the mobile device is within the predetermined level of proximity to the client device 120. The resources that can be accessed can be indicated in the window 312, with controls to initiate access, while the resources that are not accessible by the authentication token can be excluded. In this regard, the user can be shown a list of resources that are automatically accessible.

This process of selecting which resources to show in the window 312 may take into account conditions or restrictions associated with certain credentials. The client device 120 may determine, in response to the user's request to show the window 312, whether the credential or other factors allow automatic proximity-based access at the current time. Resources that can be accessed directly are listed. Resources that cannot be accessed automatically may not be listed, or may be marked as requiring additional authentication procedures. For example, an employee credential may allow access based on proximity of a paired device alone during business hours on weekdays, but not on weekends, when heightened security requirements apply. On weekdays, when the client device 120 determines that the device 110 is near and conditions of the credential for automatic access are met, the window 312 may include a control to access a secure web page. On a weekend, however, the window 312 may exclude controls to access the secure web page, when the client device 120 determines that the credential linked to the proximity-based access does not permit the automatic access at that time.

Once the user selects on a button such as the buttons 314a or 314b, the client device 120 transmits an authentication request to the server 130 as described above and depicted in FIGS. 1A-1C. The authentication request can include the device identifier for the mobile device, the resource associated with the selected button, and/or a measured proximity between the client device 120 and the mobile device. The server system 130 then determines whether conditions for access have been met as described above.

For example, if the conditions for access have been met, the server system 130 then instructs the client device 120 to provide access to the resource, and the resource is then automatically provided for output on the interface 300. Alternatively, if the conditions for access are not met, the server system 130 can either instruct the client device 120 request the user to provide supplemental credential information (e.g., a username and password) or deny access entirely as described above.

In some implementations, the client device 120 can begin an authentication process to grant access to one or more resources accessible through the window 312 before the user selects a control to request access. For example, when the user selects the icon 310 to cause the window 312 to be displayed, the client device 110 can communicate with a server to begin authenticating a single-sign-on (SSO) session with a credential management server. The window 312 can display each of the resources that are accessible through the SSO login for the user. While the user is reviewing the list of resources available, the client device 120 and the server 130 communicate to authenticate the SSO session. As a result, when the user requests access to a resource through the controls in the window 312, authentication for a SSO session allowing access to the resource is already in progress, or in some instances has already been completed. In this manner, an authentication request can be sent before the user selects a specific resource from the list in the window 312, and the user does not experience the full delay of processing needed performing authentication.

Figure 4:
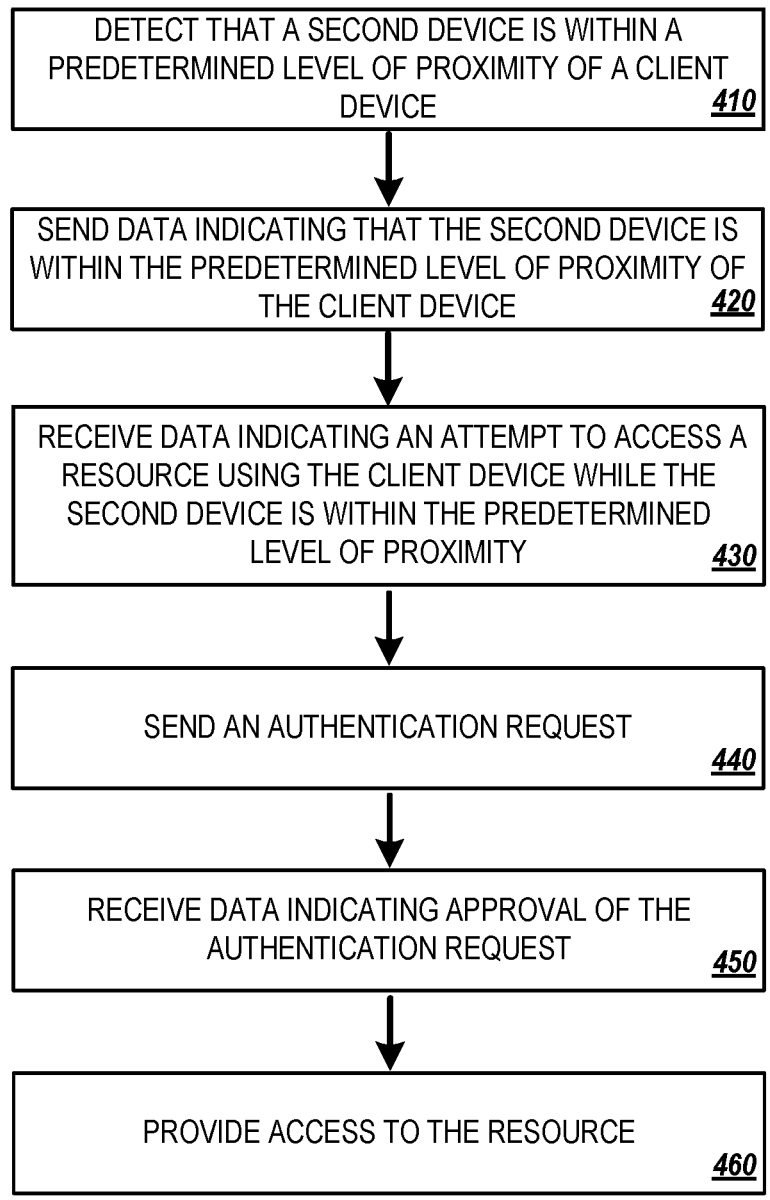
FIGS. 4-5 are diagrams that illustrate examples of processes for automatically providing a user with access to a resource.
Figure 5:
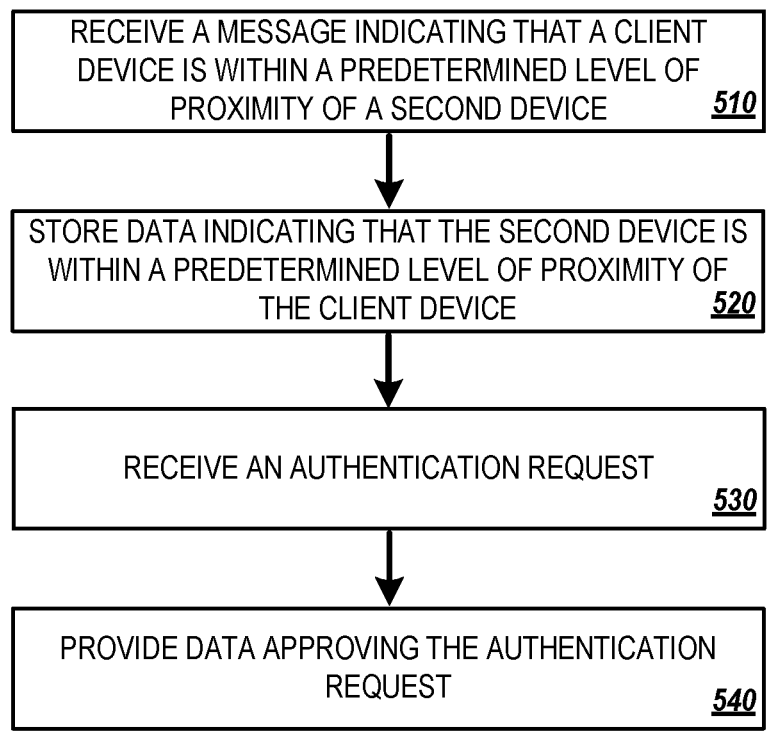

FIGS. 4-5 are diagrams that illustrate examples of processes for providing a user with access to a resource. Referring initially to FIG. 4, an example of a process executed by a client device is illustrated. Briefly, the process 400 can include detecting that a second device is within a predetermined level of proximity of a client device (410), sending data indicating that the second device is within the predetermined level of proximity of the client device (420), receiving data indicating an attempt to access a resource using the client device while the second device is within the predetermined level of proximity (430), sending an authentication request (440), receiving data indicating approval of the authentication request (450), and providing access to the resource (460).

In more detail, the process 400 can include detecting that a second device is within a predetermined level of proximity of a client device (410). For example, the client device 120 can detect that the mobile device 110 that has been designated as an authentication token for the user 101 is within a predetermined level of proximity to the client device 120. The predetermined proximity level can be determined based on, for instance, a predetermined level of proximity that corresponds to the detectability range of the client device 120 (e.g., a region surrounding the client device 120 where a broadcasting device can be detected by the client device 120).

In some implementations, the client device 120 detects that the mobile device 110 is within a predetermined level of proximity based on receiving a communication from the mobile device 110 over a direct, wireless radio-frequency channel. The client device 120 and the mobile device can also communicate using other types of short-range wireless communications. Examples include wireless personal area networks, Bluetooth communications, among others.

In some implementations, the client device 120 determines that the mobile device 110 is within a predetermined level of proximity based on determining that a signal strength of the communication from the mobile device 110 satisfies a signal strength threshold. For example, in such implementations, the signal strength over the wireless communication link can be used as an indicator of distance between the devices 110, 120. Once the signal strength of the communication exceeds the signal strength threshold, the client device 120 determines that the mobile device 110 is within the predetermined level of proximity of the client device 120.

In some implementations, the client device 120 stores data indicating that the mobile device 110 has been designated as an authentication token for the user before detecting that the mobile device 110 is within the predetermined level of proximity. For example, the stored data can include a hardware identifier associated with the mobile device (e.g., a MAC address), a credential associated with the mobile device 110 that has been designated as an authentication token for the user, among other types of information. The client device 120 can use the stored data to determine that a particular device that transmits a communication is the second device.

In some implementations, the client device 120 can verify an identity of the mobile device 110 once it receives an incoming communication from the mobile device 110 or determines that the mobile device 110 is within a predetermined level of proximity of the client device 120. For example, the incoming communication can include a device identifier (e.g., a MAC address) or an encryption key used by the mobile device 110. The information included within the incoming communication can be compared with stored data that includes verified information of the mobile device 110 to verify the identity of the mobile device 110.

The process 400 can include sending data indicating that the second device is within the predetermined level of proximity of the client device (420). For example, in response to detecting that the mobile device 110 is within the predetermined level of proximity to the client device 120, the client device 120 can send data indicating that the mobile device 110 is within the predetermined level of proximity to the server system 130. As illustrated in FIGS. 1A and 1B, the client device 120 can transmit a message 102 that identifies a connection event between the client device 120 and the mobile device 110.

The process 400 can include receiving data indicating an attempt to access a resource using the client device while the second device is within the predetermined level of proximity (430). For example, the client device 120 can receive data indicating an attempt to access a resource using the client device 120. The access attempt can be received while the mobile device 110 is within the predetermined level of proximity to the client device 120. As described above, examples of access attempts can include a user input to navigate to a web page, opening a bookmark of a web browser that runs on a client device, selecting an icon of an application or a file, or executing a command to run an application, open a file, or query data from a database.

The data indicating an attempt to access a resource can be associated with various types of user inputs in relation to different resources. In some implementations, the data indicating an attempt to access a resource includes receiving data indicating an attempt to access a file, a local application, a remote application, a web page, a VPN, a network resource, or a database. In other implementations, the data indicating an attempt to access a resource using the client device 120 includes receiving data indicating a user input to navigate a web page, open a bookmark of a web browser, select an icon, or open an application.

The process 400 can include sending an authentication request (440). For example, in response to receiving the data indicating the access attempt, the client device 120 can send an authentication request to the server system 130. As depicted in FIG. 1A, the client device 120 can transmit the authentication request 104 to the server system 130. The authentication request 104 can include information associated with the access attempt received on the client device 120. For example, the authentication request 104 can indicate a particular resource that the user 101 has attempted to access on the client device 120, context data associated with the access attempt (e.g., time associated with the access attempt, background processes currently running on the client device 120, etc.).

The process 400 can include receiving data indicating approval of the authentication request (450). For example, the client device 120 can receive data indicating approval of the authentication request from the server system 130. As described above, the server system 130 can transmit the approval based on determining that conditions associated with authentication have been satisfied.

In some implementations, the client device 120 receives the access attempt after the client device 120 sends a message to the server system 130 indicating that the mobile device 110 is within the predetermined level of proximity of the client device 120 as described in step (420). In such implementations, the data indicating approval of the authentication request that is received by the client device 120 includes an indication of approval of the authentication request that is provided by the server system 130. The indication by the server system 130 can be based on the data indicating that the mobile device 110 is within the predetermined level of proximity of the client device 120 that was included in the message to the server system 130.

The process 400 can include providing access to the resource (460). For example, the client device 120 can provide access to the client device 120 based on receiving the data indicating approval of the authentication request. As described above, the client device 120 can receive the access approval indication 106 from the server system 130. The access approval indication 106 can include instructions that configure the client device 120 to provide access to the resource that attempted to be accessed by a user.

In some implementations, the client device 120 can provide access to the resource without requiring user input to the client device 120 or the mobile device 110 following the attempt to access the resource. In addition, the client device 120 can provide access without requiring communication between the server system 130 and the mobile device 110 following the attempt to access the resource. For example, as depicted in FIG. 1A, access can be provided on the client device 120 independently of the network connectivity of the mobile device 110 because access is provided based on receiving the access approval indication 106 from the server system 130.

In some implementations, the client device 120 can perform operations in addition to the operations described above. For example, the client device 120 can determine that the mobile device 110 is no longer within the predetermined level of proximity of the client device 120. As depicted in FIG. 1C, the client device 120 can determine when the mobile device 110 moves away from the client device 120 and is no longer detectable by the client device 120, indicating that a disconnection event has taken place. In response, the client device 120 can send a message indicating that the mobile device 110 is no longer within the predetermined level of proximity of the client device to the server system 130. As depicted in FIG. 1C, the client device 120 can transmit the message 102*c* to the server system 130.

In addition, the client device 120 can receive an access revocation indication from the server system 130. The access revocation can be provided in response to the message indicating that the mobile device 110 is no longer within the predetermined level of proximity of the client device 120. The access revocation indication can indicate that the authentication for access for the resource has been revoked. For example, as depicted in FIG. 1C, the server system 130 transmits the access revocation indication 106c to the client device 120. The client device 120 can then terminate access to the resource after receiving the access revocation indication 106c.

Once terminated, the client device 120 is prevented from automatically authenticating a user for a subsequently received access attempt). Alternatively, in other implementations, the client device 120 may adjust the policies or standards associated with granting access in response to receiving an access attempt. For example, the client device 120 can increase the standards (e.g., requiring two-factor authentication instead of a single-factor authentication), restrict access entirely (e.g., preventing access until the mobile device 110 is located within the predetermined level of proximity level of the client device 120), or require the user to provide credential information (e.g., requiring the user to provide credential information associated with the resource that is attempted to be accessed).

Referring now to FIG. 5, an example of a process executed by a server system is illustrated. Briefly, the process 500 can include receiving a message indicating that a client device is within a predetermined level of proximity of a second device (510), storing data indicating that the second device is within a predetermined level of proximity of the client device (520), receiving an authentication request (530), and providing data approving the authentication request (540).

In more detail, the process 500 can include receiving a message indicating that a client device is within a predetermined level of proximity of a second device (510). For example, the server system 130 can receive a message from the client device 120 over the network 105. The received message can indicate that the client device 120 is within a predetermined level of proximity of the mobile device 110 that was previously designated as an authentication factor for the user 101. For example, the server system 130, as depicted in FIGS. 1A and 1B, can receive the message 102 from the client device 120.

As described above, the message 102 received by the server system 130 can indicate information for a connection event indicating the establishing of a wireless connection between the mobile device 110 and the client device 120. For example, the information can indicate the establishing of a direct, wireless connection between the devices 110, 120. The information can also include a device identifier (e.g., a MAC address) of the mobile device 110 that is compared against verified information for the mobile device 110.

The process 500 can include storing data indicating that the second device is within a predetermined level of proximity of the client device (520). For example, the server system 130 can store data indicating that the mobile device 110 is within the predetermined level of proximity of the client device 120. The data that is stored can include connection event information that is indicated within the received message in step 510. For example, the server system 130, as depicted in FIGS. 1A and 1B, can store data to update the connection event data 132 based on the information included within the message 102.

In some implementations, the server system 130 can update the stored data on an ongoing basis so that the stored data reflects a current status indicating whether any trusted device such as the mobile device 110 is present within the predetermined proximity level of the client device 120. For example, as depicted in FIGS. 1A and 1B, the server system 130 can update the connection event data 132 for the mobile device 110 each time it receives a message such as the message 102. As shown, the connection event data 132 indicates a record of connection and disconnection events, which includes a most recent connection/disconnection event that indicates whether the mobile device 110 is currently present within the predetermined proximity level of the client device 120. For example, if the most recent message from the client device 120 indicates a connection event, then the server system 130 can determine that the mobile device 110 is currently nearby the client device 120. Alternatively, if the most recent message from the client device 120 indicates a disconnection event, then the server system 130 can determine that the mobile device 110 is not currently nearby the client device 120.

In addition, the server system 130 can store data for multiple devices for a single user, or devices for multiple users. For example, the server system 130 may store data for multiple mobile devices that are each associated with a different authentication token for the same user. In this example, the server system 130 can use a device identifier indicated within received messages from the client device 120 to identify which mobile device from among the multiple mobile devices is currently within the predetermined level of proximity level for the client device 120. In other examples, where data is stored for devices of multiple users, the server system may store device associations between device identifier and a user identifier. In such examples, the server system 130 can use a device identifier indicated within the received messages from the client device 120 to identify a user from among the multiple users that is attempting to access a resource on the client device 120.

The process 500 can include receiving an authentication request (530). For example, after storing the data indicating that the mobile device 110 is within the predetermined level of proximity of the client device 120, the server system 130 can receive an authentication request from the client device 120. The received authentication request can identify an attempt to access a resource on the client device 120. For example, the server system 130, as depicted in FIG. 1A, can receive the authentication request 104 from the client device 120.

In some implementations, the authentication request is a security assertion markup language (SAML) request for exchanging authentication and authorization data between an identity provider and a service servicer. For example, the authentication request is provided for a web browser single sign-on (SSO) system, which, upon receiving approval from the server system 130, enables the client device 120 to authenticate the user to multiple resources using a single access credential associated with the mobile device 110.

The process 500 can include providing data approving the authentication request (540). For example, the server system 130 can provide data approving the authentication request to the client device 120. The server system 130 can determine the approval based on the stored data indicating that the mobile device 110 within in the predetermined level of proximity of the client device 120. The server system 130, as depicted in FIG. 1A, can approve the authentication request based on verifying that conditions for authentication have been met. As an example, the server system 130 can approve the authentication request if the mobile device 110 is currently within the predetermined proximity level of the client device 120 when an access attempt is received by the client device 120.

As described above, the decision by the server system 130 to approve the authentication request can be performed without requiring the server system 130 to exchange communications with the mobile device 110. In addition, the approval can enable the client device 120 to automatically authenticate the user without requiring to provide any user input after he/she has submitted an attempt to access a resource. For example, the user can be authenticated without having to provide a password or any other authentication code to establish his/her identity to the client device 120.

In addition, the server system 130 can determine to approve the authentication request based on making various determinations. In some implementations, the server system 130 determines whether the requested type of access qualifies for proximity-based automatic authentication for the user. In such implementations, this determination can be based on the type of access, the type of resource, and/or other types of context data surrounding that access attempt (e.g., time of received access attempt, background processes running on the client device 120, a number of prior access attempts for the same resource within a certain period of time, etc.).

In some implementations, such as the example depicted in FIG. 1B, the approval determination can be based on identifying whether the access attempt requires heightened security due to, for example, the type of access or the type of resource attempted to be accessed. In such implementations, the server system 130 can provide approval based on whether the user has submitted additional credential information that is required to provide proximity-based automatic user authentication for a high-risk authentication attempt.

In some implementations, the approval determination can be based on determining whether conditions or policies that are associated with a credential have been met when the client device 120 receives the access attempt. Examples of conditions can be based on a time of day when the access attempt has been received, a predetermined level of proximity of the mobile device 110 to the client device 120, a device type of a client device 120 that receives the access attempt, logging/reporting requirements for the use of the credential, among others.

In some implementations, the server system 130 can additionally transmit an access revocation indication to the client device 120 to prevent the client device 120 from automatically authenticating the user on the client device 120. In such implementations, the server system 130 can transmit the access revocation indication based on receiving a message from the client device 120 indicating a disconnection event. For example, the server system 130, as depicted in the example in FIG. 1C, can transmit the access revocation indication 106c to the client device 120 based on receiving the message 102c indicating that the mobile device 110 has moved out of the predetermined level of proximity level of the client device 120.

In some implementations, the server system 130 can also revoke the credential entirely based on data received from the client device 120. For example, the server system 130 may revoke the credential associated with the mobile device 110 if there are a number of failed access attempts that are received on client device 120. In another example, the server system 130 may revoke the credential if the messages received from the client device 120 indicate that a user is attempted to spoof a connection event with another device that is not a trusted device. If the server system 130 revokes the credential, then the authentication token for the user 101 that has been assigned to the mobile device 110 can also be revoked such that a subsequent access attempt received on the client device 120 when the mobile device 110 is within a predetermined proximity level of the client device 120 does not cause the server system 130 to approve the authentication request because the credential is invalid.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
    detecting, by a client device, a change in a proximity status of a second device that has been designated as an authentication token for a user, wherein the change in the proximity status indicates that the second device has entered a predetermined level of proximity of the client device after previously being outside the predetermined level of proximity;
    in response to detecting the change in proximity status indicating that the second device has entered the predetermined level of proximity to the client device, sending, by the client device and to a server system, a proximity status change message indicating that the proximity status has changed such that the second device has entered the predetermined level of proximity of the client device;
    after sending the proximity status change message indicating that the second device entered the predetermined level of proximity of the client device, determining, by the client device, that the proximity status of the second device is maintained based on detecting the second device remaining within the predetermined level of proximity of the client device;
    after determining that the proximity status of the second device is maintained, receiving, by the client device, data indicating an attempt to access a resource using the client device while the second device is within the predetermined level of proximity to the client device;
    in response to receiving the data indicating the attempt to access the resource, sending, by the client device, an authentication request to the server system;
    receiving, by the client device and from the server system, data indicating approval of the authentication request determined based on the proximity status of the second device that the client device determined before the attempt to access the resource; and
    providing, by the client device, access to the resource based on receiving the data indicating approval of the authentication request.

2. The method of claim 1, wherein determining that the proximity status of the second device is maintained comprises periodically verifying that a wireless connection is maintained between the client device and the second device.

3. The method of claim 1, wherein receiving the data indicating the attempt to access the resource comprises:
receiving data indicating an attempt by the user to access the resource after the user has been authenticated to access the client device.

4. The method of claim 1, further comprising:
receiving, by the client device, data from the second device over a short-range wireless communication link; and
using, by the client device, the data from the second device to verify an identify of the second device or verify that the second device has been previously registered as an authentication token for the user.

5. The method of claim 1, wherein sending the authentication request to the server system comprises sending the authentication request to the server system without checking proximity of the second device after receiving the attempt.

6. The method of claim 1, wherein access to the resource is provided without requiring user input to the client device or the second device following the attempt to access the resource, and without requiring communication between the server system and the second device following the attempt to access the resource.

7. The method of claim 1, further comprising, after providing access to the resource:
determining, by the client device, that the second device is no longer within the predetermined level of proximity of the client device; and
in response to determining that that the second device is no longer within the predetermined level of proximity of the client device, sending, by the client device to the server system, a second proximity status change message indicating that the second device is no longer within the predetermined level of proximity of the client device.

8. The method of claim 7, further comprising:
receiving, by the client device, an access revocation indication provided in response to the second proximity status change message, the access revocation indication indicating that authentication for access to the resource has been revoked; and
terminating access to the resource using the client device.

9. The method of claim 1, further comprising:
receiving a communication from the second device over a direct, wireless radio-frequency communication channel; and
detecting that the second device has been designated as the authentication token for the user based on the communication received from the second device.

10. The method of claim 9, wherein detecting that the second device has been designated as an authentication token for a user is within the predetermined level of proximity of the client device comprises:
determining that the second device is within the predetermined level of proximity based on determining that a signal strength of the communication from the second device satisfies a signal strength threshold.

11. The method of claim 1, further comprising, before detecting the change in proximity status indicating that the second device has entered the predetermined level of proximity to the client device, storing, in data storage of the client device, data indicating that the second device has been designated as an authentication token for the user;
wherein detecting the change in the proximity status of the second device that has been designated as the authentication token for the user is within the predetermined level of proximity of the client device comprises:
receiving, by the client device, a communication from another device; and
based on the communication from the device, determining, by the client device, that the other device is the second device identified in the stored data in the data storage of the client device.

12. The method of claim 1, wherein receiving data indicating an attempt to access a resource using the client device comprises receiving data indicating an attempt to access a file, a local application, a remote application, a web page, a virtual private network (VPN), a network resource, or a database.

13. The method of claim 1, wherein receiving data indicating an attempt to access a resource using the client device comprises receiving data indicating user input to navigate to a web page, open a bookmark of a web browser, select an icon, or open an application.

14. The method of claim 1, wherein detecting the change in the proximity status of the second device has entered the predetermined level of proximity of the client device comprises verifying an identity of the second device based on a device identifier provided by the second device or an encryption key used by the second device.

15. The method of claim 1, wherein the second device is a mobile phone.

16. A system comprising:
one or more computers; and
one or more storage devices storing instructions that, when executed by the one or more computers, cause the one or more computers to perform operations comprising:
detecting, by a client device, a change in a proximity status of a second device that has been designated as an authentication token for a user, wherein the change in the proximity status indicates that the second device has entered a predetermined level of proximity of the client device after previously being outside the predetermined level of proximity;
in response to detecting the change in proximity status indicating that the second device has entered the predetermined level of proximity to the client device, sending, by the client device and to a server system, a proximity status change message indicating that the proximity status has changed such that the second device has entered the predetermined level of proximity of the client device;
after sending the proximity status change message indicating that the second device entered the predetermined level of proximity of the client device, determining, by the client device, that the proximity status of the second device is maintained based on detecting the second device remaining within the predetermined level of proximity of the client device; and
after determining that the proximity status of the second device is maintained, receiving, by the client device, data indicating an attempt to access a resource using the client device while the second device is within the predetermined level of proximity to the client device;
in response to receiving the data indicating the attempt to access the resource, sending, by the client device, an authentication request to the server system;

receiving, by the client device and from the server system, data indicating approval of the authentication request determined based on the proximity status of the second device that the client device determined before the attempt to access the resource; and providing, by the client device, access to the resource based on receiving the data indicating approval of the authentication request.

17. The system of claim 16, wherein access to the resource is provided without requiring user input to the client device or the second device following the attempt to access the resource, and without requiring communication between the server system and the second device following the attempt to access the resource.

18. The system of claim 16, wherein the operations further comprise after providing access to the resource:
   determining, by the client device, that the second device is no longer within the predetermined level of proximity of the client device; and
   in response to determining that that the second device is no longer within the predetermined level of proximity of the client device, sending, by the client device to the server system, a second proximity status change message indicating that the second device is no longer within the predetermined level of proximity of the client device.

19. One or more non-transitory computer-readable devices encoded with computer program instructions that, when executed by one or more computers, cause the one or more computers to perform operations comprising:
   detecting, by a client device, a change in a proximity status of a second device that has been designated as an authentication token for a user, wherein the change in the proximity status indicates that the second device has entered a predetermined level of proximity of the client device after previously being outside the predetermined level of proximity;
   in response to detecting the change in proximity status indicating that the second device has entered the predetermined level of proximity to the client device, sending, by the client device and to a server system, a proximity status change message indicating that the proximity status has changed such that the second device has entered the predetermined level of proximity of the client device;
   after sending the proximity status change message indicating that the second device entered the predetermined level of proximity of the client device, determining, by the client device, that the proximity status of the second device is maintained based on detecting the second device remaining within the predetermined level of proximity of the client device;
   after determining that the proximity status of the second device is maintained, receiving, by the client device, data indicating an attempt to access a resource using the client device while the second device is within the predetermined level of proximity to the client device;
   in response to receiving the data indicating the attempt to access the resource, sending, by the client device, an authentication request to the server system;
   receiving, by the client device and from the server system, data indicating approval of the authentication request determined based on the proximity status of the second device that the client device determined before the attempt to access the resource; and
   providing, by the client device, access to the resource based on receiving the data indicating approval of the authentication request.

20. The one or more non-transitory computer-readable devices of claim 19, wherein access to the resource is provided without requiring user input to the client device or the second device following the attempt to access the resource, and without requiring communication between the server system and the second device following the attempt to access the resource.

* * * * *

UNITED STATES PATENT AND TRADEMARK OFFICE
CERTIFICATE OF CORRECTION

PATENT NO. : 10,771,458 B1
APPLICATION NO. : 15/955277
DATED : September 8, 2020
INVENTOR(S) : Feng Xia et al.

Page 1 of 1

It is certified that error appears in the above-identified patent and that said Letters Patent is hereby corrected as shown below:

On the Title Page

Item (57) (Assignee), delete "MicoStrategy" and insert -- MicroStrategy --, therefor.

In the Claims

In Claim 7, Column 23, Line 30 (approx.), delete "that that" and insert -- that --, therefor.

In Claim 18, Column 25, Line 16, delete "comprise" and insert -- comprise, --, therefor.

In Claim 18, Column 25, Line 20, delete "that that" and insert -- that --, therefor.

Signed and Sealed this
Eighth Day of December, 2020

Andrei Iancu
*Director of the United States Patent and Trademark Office*